United States Patent [19] [11] Patent Number: 4,592,970
Zupancic [45] Date of Patent: * Jun. 3, 1986

[54] ELECTROCHEMICAL CELL HAVING A SAFETY VENT CLOSURE

[75] Inventor: Ronald L. Zupancic, Parma Heights, Ohio

[73] Assignee: Union Carbide Corporation, Danbury, Conn.

[*] Notice: The portion of the term of this patent subsequent to Jul. 16, 2002 has been disclaimed.

[21] Appl. No.: 654,949

[22] Filed: Sep. 27, 1984

[51] Int. Cl.$^4$ ............................................. H01M 2/12
[52] U.S. Cl. ........................................ 429/82; 424/53; 424/56; 424/185
[58] Field of Search ................................ 429/53–56, 429/185, 82

[56] References Cited
U.S. PATENT DOCUMENTS 404,350  7/1882  Zupancic .
3,415,690 12/1968 Richman .
3,556,863  1/1971  Nathe .
3,664,878  5/1972  Amthor .
4,207,385  6/1980  Hayama .
4,233,372 11/1980 Bro et al. ................ 429/185 X
4,279,975  7/1981  Bowski .................. 429/185 X
4,329,405  5/1982  Zupancic ................... 429/56
4,397,919  8/1983  Ballard .
4,437,231  3/1984  Zupancic ................ 429/53 X
4,483,908 11/1984 Zimmerman ............. 429/53 X Primary Examiner—Brian E. Hearn
Assistant Examiner—Stephen J. Kalafut
Attorney, Agent, or Firm—C. F. O'Brien

[57] ABSTRACT

A non-resealable vent closure for galvanic cells, such as nonaqueous cells, which comprises a member force-fitted within a liner disposed adjacent the wall defining an orifice and wherein a sealant is disposed between the wall defining the orifice and the liner so as to prevent electrolyte leakage at the interface of the liner and the wall defining the orifice.

10 Claims, 6 Drawing Figures

FIG. 2
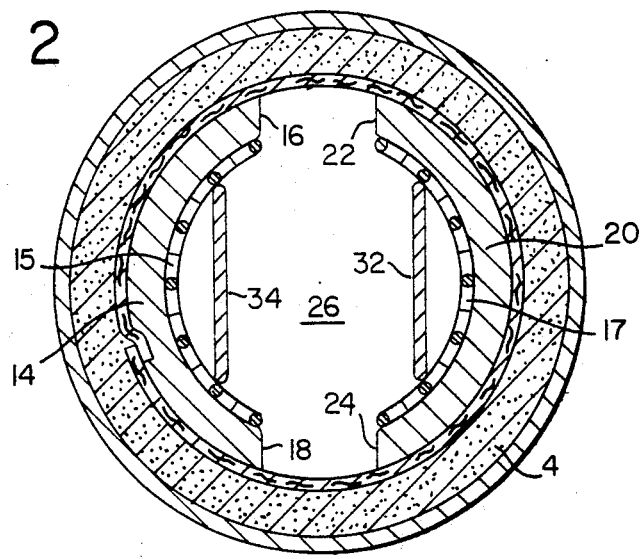
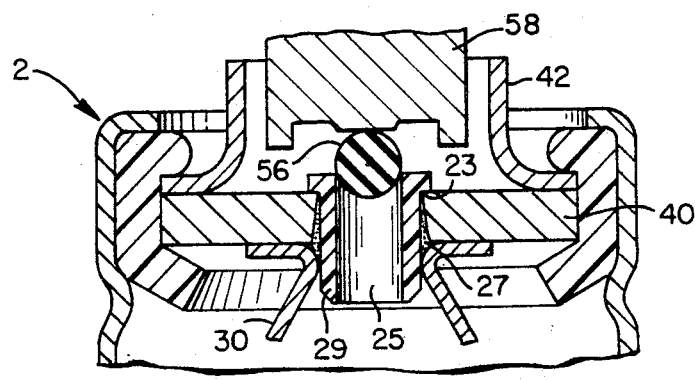
FIG. 3

ELECTROCHEMICAL CELL HAVING A SAFETY VENT CLOSURE

TECHNICAL FIELD

This invention relates to a safety, non-resealable vent closure for galvanic cells, such as nonaqueous liquid oxyhalide cells.

BACKGROUND ART

Galvanic cells may generate large quantities of gas under certain conditions during use. Since many such cells are required to be tightly sealed in order to prevent loss of electrolyte by leakage, high internal gas pressures may develop. Such pressures may cause leakage, bulging or possible rupture of the cell's container under abusive conditions if not properly vented.

In the past, several different types of resealable pressure relief vent valves have been used for releasing high internal gas pressures from inside a sealed galvanic cell. One type of valve that has been commonly used consists basically of a valve member such as a flat rubber gasket which is biased into sealing position over a vent orifice by means of a resilient member such as a helical spring. The resilient member or spring is designed to yield at a certain predetermined internal gas pressure so as to momentarily break the seal and allow the gas to escape through the vent orifice.

In U.S. Pat. No. 3,664,878 to Amthor issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the build-up of a predetermined high internal gas pressure inside the container so as to momentarily break the seal and allow gas to escape through the vent orifice.

However, with the continuing development of portable electrically powered devices such as tape recorders and playback machines, radio transmitters and receivers, and the like, a new type of reliable, long service life cells or batteries has been developed. These newly developed electrochemical cell systems provide a long service life by utilizing highly reactive anode materials such as lithium, sodium and the like, in conjunction with high energy density nonaqueous liquid cathode materials and a suitable salt.

It has recently been disclosed in the literature that certain materials are capable of acting both as an electrolyte carrier, i.e., as solvent for the electrolyte salt, and as the active cathode for a nonaqueous electrochemical cell. U.S. Pat. No. 4,400,453 discloses a nonaqueous electrochemical cell comprising an anode, a cathode collector and a cathode-electrolyte, said cathode-electrolyte comprising a solution of a ionically conductive solute dissolved in an active cathode depolarizer wherein said active cathode depolarizer comprises a liquid osyhalide of an element of Group V or Group VI of the Periodic Table. The "Periodic Table" is the Periodic Table of Elements as set forth on the inside back cover of the Handbook of Chemistry and Physics, 63rd Edition, The CRC Press Inc., Boca Raton, Fla., 1982-1983. For example, such nonaqueous cathode materials would include sulfuryl chloride, thionyl chloride, phosphorus oxychloride, thionyl bromide, chromyl chloride, vanadyl tribromide and selenium oxychloride.

Another class of liquid cathode materials would be the halides of an element of Group IV to Group VI of the Periodic Table. For example, such nonaqueous cathode materials would include sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, tin dibromide dichloride and tin tribromide chloride.

It has been found that when employing high energy density liquid cathode materials in nonaqueous cell systems, the cells exhibit higher voltages than cells employing conventional aqueous systems which results in fewer cell units being required to operate a particular battery-powered device. In addition, many of the oxyhalide and halide nonaqueous cells display relatively flat discharge voltage-versus-time curves. Thus these cells can be employed to produce batteries that will provide a working voltage closer to a designated cut-off voltage than is practicable with some conventional aqueous systems which generally do not exhibit flat discharge voltage-versus-time curves.

However, one possible disadvantage in the use of oxyhalide and halide liquid cathode nonaqueous cells is that it may be possible that during storage or use, some of the oxyhalide, halide or their reaction products may escape from the cell. This escape of liquids and/or gases could cause damage to the device employing the cell or to the surface of a compartment or shelf where the cell is stored. On the other hand, if the seal of the cell is effectively permanently secured, then it is possible that the build-up of internal pressure within the cell could cause the cell's container to rupture which may cause property and/or bodily damage. To prevent rupture of the cell's container from possible internal pressure build-up caused under abusive conditions, such as charging and exposure to a high temperature environment, it is necessary to vent the cell at some predetermined pressure. It has been reported that some oxyhalides such as thionyl chloride and sulfuryl chloride should be vented at pressures below about 500 psi and preferably between about 150 and 300 psi.

U.S. Pat. No. 4,329,405 discloses a safety blow-out vent closure for galvanic cells, such as nonaqueous oxyhalide cells, which comprises the employment of a conductive tubular member secured to the cell's housing and surrounding a vent orifice in the cell's housing and wherein a deformable member is force-fitted in said vent orifice and adapted to at least partially be ejected from the vent orifice upon the build-up of a predetermined internal gas pressure within the cell. In some applications, the wall defining the vent orifice in the cover could be subjected to corrosion at the deformable member-wall interface. This corrosion could roughen the wall surface and thereby increase the coefficient of friction between the deformable member and the wall of the vent orifice thereby resulting in the venting of the cell at unpredictable pressures. To overcome this potential problem, U.S. patent application Ser. No. 404,350, now U.S. Pat. No. 4,529,673, discloses the use of a corrosion-resistant material disposed at the interface of the wall defining a vent orifice and a force-fitted member. However, during storage and discharge some electrolyte may at times leak at the interface of the wall defining the vent orifice and the corrosion-resistant material.

It is, therefore, an important object of this invention to provide a safety non-resealable vent closure for electrochemical cells, specifically oxyhalide cells that will vent at a predictable low pressure.

It is another object of this invention to provide a safety non-resealable vent closure for cylindrical cells employing, for example, liquid oxyhalides, as the active cathodic material and having improved electrolyte leakage characteristics.

It is another object of this invention to provide a safety non-resealable vent closure for nonaqueous cells that is inexpensive to manufacture and easy to assemble.

The foregoing and additional objects will become fully apparent from the following description and the accompanying drawings.

DISCLOSURE OF THE INVENTION

The invention relates to an electrochemical cell comprising active components of the cell assembled within a housing, said housing comprising a container having an open end closed by a cover and having at least one orifice defined by a wall in said housing, a liner that is corrosion-resistant to the cell's active components disposed adjacent the wall defining the orifice, a member force-fitted within said liner to provide a fluid tight-seal for said orifice, and wherein at least one of said liner and said member is resiliently deformable such that said member is adapted to be at least partially expelled from the vent orifice upon a predetermined internal gas pressure buildup within the cell to provide a permanent vent for the cell; the improvement wherein a first sealant is disposed at the interface of the wall defining the orifice and said liner.

The corrosion-resistant liner could be formed from (1) a sheet material molded to shape during the force-fitting of the member within the orifice; (2) using a premolded insert within the orifice in the cell's housing; or (3) cutting a tube of corrosion-resistant material and then using it as the liner for the orifice whereupon at least one end of the tubing could be flared over the wall of the cell's housing which defines the orifice. In each embodiment, the corrosion-resistant liner must not form an integral part of the force-fitted member. It is necessary to insure that no corrosion will form at the interface of the liner and the force-fitted member and thus does not effectively alter the vent release pressure of the force-fitted member from the liner.

Suitable corrosion-resistant materials for the liner for use in the invention include nylon, polyethylene, polytetrafluoroethylene, fluorinated ethylene-propylene polymer, perfluroalkoxy polymer, ethylene-fluorinated ethylene polymer, glasses and metals. In some cell applications, it would be preferable to use a resiliently deformable liner. It is understood that the selection of the proper material will depend on the electrochemical system employed in order to insure its corrosion resistance.

In this invention a layer of sealant is disposed between the wall of the orifice and the liner to prevent leakage of the electrolyte at this interface. Many electrolytes have a propensity for creepage along component parts of a cell and eventually may find a path to the outside of the cell. Electrolyte leakage not only reduces the capacity of the cell but renders the cell unmarketable in the conventional retail trade. Suitable sealant materials for use in this invention are asphalt, wax such as halocarbon wax which is a saturated low-molecular weight polymer of chlorotrifluoroethylene having the general formula: $-(CH_2CFCL)_n-$, epoxy or any material which is resistant to moisture, having reasonable adhesion to the cell's housing and/or the liner, chemically resistant to the cell's components, and can be easily applied. The sealant layer can be applied to the wall defining the orifice and/or the liner prior to placing the liner adjacent the wall of the orifice.

As used herein, the force-fitted member could be made of metals, glass or ceramics but could be resiliently deformable and made of a material or coated with a material that is chemically resistant to the cell's components, particularly the cell's liquid components. If the force-fitted member is resiliently deformable, the material of which it is made can be selected from the group consisting of polytetrafluoroethylene, fluorinated ethylene-propylene copolymer, perfluoroalkoxyethylene polymer, ethylene-tetrafluoroethylene copolymer and the like. When the deformable material forming the force-fitted member is to be coated with a chemically inert material, the said deformable material can be selected from the group consisting of nylon, hard rubber and the like. Suitable materials for use in this invention but not suitable for some of the oxyhalide cell systems are nylon, polypropylene, polycarbonate, acrylic polymers and the like. Preferably, the force-fitted member should have a smooth spherical configuration and the inner surface of the liner should be substantially smooth.

In a preferred embodiment of the cell, a conductive tubular member would completely surround the vent orifice and preferably would be secured to the cell's housing. This tubular member could function as a terminal of the cell. Preferably in this embodiment, after the cell has been assembled and filled with the force-fitted member in place, a layer of second sealant material such as asphalt or wax could be disposed within the tubular member over the force-fitted member and the area of the housing defining the vent orifice surrounded by the tubular member. The advantage of this sealant material is that it will provide maximum leakage resistance as well as further increase reliability to vent after a predesignated pressure builds up. Suitable sealing materials could include halocarbon wax which is a saturated low-molecular weight polymer of chlorotrifluoroethylene having the general formula: $-(CH_2CFCl)_n-$, asphalt, epoxy or any materials which are resistant to moisture, having reasonable adhesion to metal and can be applied easily. Preferably the material should be applied in liquid form and then set to a solid.

The tubular member, when employed, can be cylindrical, square, rectangular or have any polygonal-shaped cross section. In the preferred embodiment, the cell will be a cylindrical cell in which the orifice is disposed in the cell's cover and wherein the conductive tubular member, which serves as an electrical terminal for the cell, will be a cylindrical member having an outwardly disposed flange at one end which is adapted for securing to the cell's cover. The tubular member is ideally suited as an element to which conductive strips can be welded to serve as external leads.

The safety vent closure of this invention using a force-fitted member can be made to vent at any predetermined pressure build-up within the cell by regulating the size of the vent opening with respect to the size of the force-fitted member, the material of which the force-fitted member is made, the degree of deformation required of the force-fitted member and/or corrosion-resistant material, the thickness and material of which the corrosion-resistant liner is made, and the shapes of the vent opening and the force-fitted member. In the practice of this invention, the force-fitted member can be inserted rapidly into the orifice with a minimum of force to attain a reliable and predictable safety vent closure. The use of a controlled height dead-stop ram to insert the force-fitted member would be most desirable for automatic assembly operations.

A preferred version of the safety vent closure of this invention for use in oxyhalide cells would utilize a glass ball force-fitted within a polytetrafluoroethylene liner wherein the liner is compressed 20 to 40 percent during insertion of the ball into the liner. A layer of halocarbon wax is disposed between the wall of the liner and the wall defining the orifice. Once inserted, the ball will maintain a substantially spheroidal configuration. After assembly, an asphalt overseal is placed over the ball and the liner and within the tubular member.

The safety non-resealable vent closure of this invention preferably can be employed with all size cells and is ideally suited for liquid cathode cell systems employing, for example, a liquid oxyhalide. In addition to providing an excellent and effective safety venting means, the invention also permits the initial assembling of the solid components of a cell within a container that can be closed in a conventional manner before adding the cell's liquid component. When the cell's liquid component is an oxyhalide-based liquid cathode, such as thionyl chloride or sulfuryl chloride, then these corrosive liquids can be injected into the cell's housing through the small vent orifice, e.g., by vacuum filling, after the cell cover is secured to the container. This will effectively eliminate the corrosion of crimping equipment used to close the cell as well as eliminating contamination at the interfaces of the container-gasket and gasket-cover of the cell by the oxyhalide. In using vacuum filling techniques to inject the electrolyte into the cell, the layer of sealant in accordance with this invention will effectively prevent any of the electrolyte upon being drawn up between the liner and the orifice.

A cell for use in this invention can be of the split internal anode/outer cathode collector construction as described in U.S. Pat. No. 4,032,696 or the split internal cathode collector construction as described in U.S. Pat. No. 4,048,389, said U.S. Pat. Nos. 4,032,696, and 4,048,389 being incorporated herein by reference.

Suitable nonaqueous liquid cathode materials for use in cells of this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 63rd Edition, The CRC Press Inc., Boca Raton, Fla., 1982-1983. For example, such nonaqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. Another suitable cathode material would be liquid sulfur dioxide.

Anodes suitable for use in nonaqueous liquid cathode cell systems can be generally consumable metals and include the alkali metals, alkaline earth metals and alloys of alkali metals or alkaline earth metals with each other and other metals. The term "alloy" as used herein is intended to include mixtures; solid solutions such as lithium-magnesium; and intermetallic compounds such as lithium monoaluminide. The preferred anode materials are the alkali metals and particularly lithium, sodium and postassium. When using a lithium anode, the anode may be coated with a vinyl resin as disclosed in U.S. Pat. No. 3,993,501, said patent incorporated herein by reference.

The cathode collector for use in liquid cathode cell systems has to be electronically conductive so as to permit external electrical contact to be made with the active cathode material and also provide extended area reaction sites for the cathodic electrochemical process of the cell. Materials suitable for use as a cathode collector are carbon materials and metals such as nickel, with acetylene black being preferable. In addition, the cathode collector when made of a particulate material should be capable of being molded directly within a can or capable of being molded into various size discrete bodies that can be handled without cracking or breaking. To impart a cohesive characteristic to some types of cathode collectors, such as carbonaceous cathode collectors, a suitable binder material, with or without plasticizers and with or without stabilizers, can be added to the cathode collector materials. Suitable binder materials for this purpose may include vinyl polymers, polyethylene, polypropylene, polyacrylics, polystyrene and the like. For example, polytetrafluoroethylene would be the preferred binder for cathode collectors for use with liquid oxyhalide cathodes. The binder, if required, should be added in an amount between about 5% and about 30% by weight of the molded cathode collector since an amount less than 5% would not provide sufficient strength to the molded body while an amount larger than 30% would wetproof the surface of the carbon and/or reduce the available surface of the carbon, thereby reducing the activation site areas required for the cathodic electrochemical process of the cell. Preferably, the binder should be between 10% and 25% by weight of the cathode collector. Of importance in selecting the materials for the cathode collector is to select materials that will be chemically stable in the cell system in which they are to be used.

A solute for use in liquid cathode cell systems may be a simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December, 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in conjunction with liquid oxyhalide cathodes include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

If desired, and specifically for the halides, a cosolvent should be added to the liquid active reducible cathode and solute solution to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, q-butyrolactone, sulfolane, ethylene glycol sulfite, dimethyl sulfite, benzoyl chloride, dimethoxyethane, dimethyl isoxazole, diethyl carbonate, sulfur dioxide and the like.

Suitable separators for use with liquid cathodes in nonaqueous cells are the nonwoven glass separators.

The container of the cell could be made of stainless steel, iron, nickel, plastic, coated metals or some other suitable material.

Some preferred combinations of nonaqueous cathode materials and anodes would be as follows:
  (1) sulfuryl chloride/Li or Na;
  (2) thionyl chloride/Li or Na;
  (3) phosphorus oxychloride/Li or Na;
  (4) sulfur monochloride/Li or Na;
  (5) sulfur monobromide/Li or Na;
  (6) selenium tetrafluoride/Li or Na.

Preferably, the cells for use in this invention would be liquid oxyhalide cells using sulfuryl chloride, thionyl chloride or mixtures thereof with a lithium anode.

It is to be understood that the safety vent closure of this invention could be used in other cell systems such as, for example, Leclanche dry cells, zinc chloride cells, lithium-$MnO_2$ cells, lithium-iron sulfide cells, alkaline-$MnO_2$ cells, nickel-cadmium cells, and lead-acid cells.

The present invention will become more apparent from the following description thereof when considered together with the accompanying drawing which is set forth as being exemplary of embodiments of the present invention and is not intended in any way to be limitative thereof and wherein FIG. 1 is a vertical cross sectional view of an electrochemical cell having its solid components fully assembled within a housing and being ready for receiving the liquid component of the cell.

FIG. 2 is an enlarged horizontal cross sectional view taken along line 2—2 of FIG. 1.

FIG. 3 is a partial vertical cross sectional view of the cell of FIG. 1 after the addition of the liquid component and just prior to inserting the force-fitted member into the orifice in the cell's cover and wherein a corrosion-resistant liner is disposed adjacent the wall defining the orifice and a sealant is disposed at the interface of the liner and the wall defining the orifice.

Figure 1:
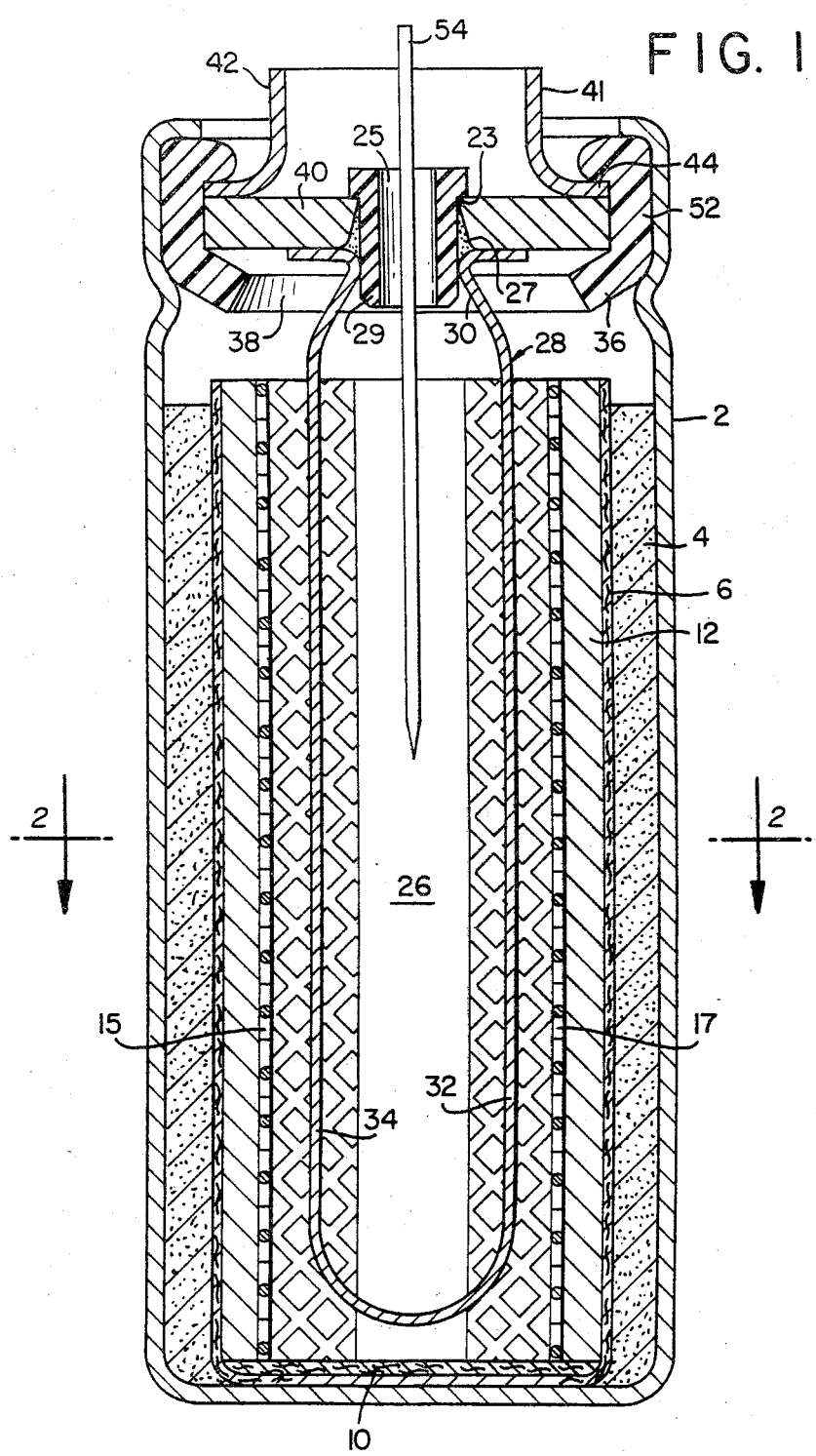

Referring in detail in FIG. 1, there is shown a cross sectional view of cylindrical cell comprising a cylindrical container 2 having disposed therein a cathode collector shell 4 in contact with the inner upstanding circumference of the container 2 thereby adapting the container as the cathodic or positive terminal for the cell. Disposed within and in contact with the inner circumference of cathode collector 4 is a separator liner 6 with its bottom separator or disc 10. If desired, the cathode collector material could be extruded within the container 2, rolled with the container material or composed of one or more segments to form a cylindrical tube and then placed in the container.

A two-member anode 12 is shown in FIGS. 1 and 2 comprising a first half cylindrical annular member 14 having flat end faces 16 and 18 and a second half cylindrical annular member 20 having flat end faces 22 and 24. When the flat end faces of each cylindrical half member are arranged in an opposing fashion as shown in FIGS. 1 and 2, an axial cavity 26 is defined between the cylindrical half annular members 14 and 20.

If desired, arcuate type backing sheets 15 and 17, such as inert electrically conductive metal screens or grids, could be disposed against the inner surface wall of the anode bodies 14 and 20, respectively, to provide uniform current distribution over the anode. This will result in a substantially uniform consumption or utilization of the anode while also providing a substantially uniform spring pressure over the inner wall surface of the anode as will be discussed below.

An electrically conductive spring strip 28 is appropriately bent into a flattened elliptically-shaped member having extending ends 30. When inserting the spring strip 28 into a container, the legs 32, 34 of the conductive strip 28 are squeezed together and forced into the axial opening between the two screen-backed anode members arranged in a container as shown in FIGS. 1 and 2. The inserted conductive spring strip 28 resiliently biases the two anode members 14 and 20 via backing screens 15 and 17 so as to provide substantially uniform and continuous pressure contact over the inner wall of the anode members. The extended ends 30 of spring strip 28 are shown projected above the surface of anode members 14 and 20. An insulating gasket 36 has a central opening 38 through which the projected ends 30 of the spring strip 28 passes, whereupon the ends 30 are then welded to a cover 40 thereby adapting the cover 40 as the anodic or negative terminal of the cell.

Secured to the cover 40 is a cylindrical tube 42. Specifically, the cylindrical tube comprises a cylindrical segment 41 terminating at one end with an outwardly oriented flange 44 which is secured to cover 40.

The insulating gasket 36 has a peripheral depending skirt 52 disposed between the cover 40 and the upper inner wall of the container 2 for closing the cell through conventional crimping techniques. As shown in FIG. 1, the cylindrical tube is secured to the cover 40 and the cell is closed using conventional crimping techniques with all of the solid components of the cell assembled within the container 2. After the cell is assembled with the solid components, a hypodermic needle 54 or the like is used to inject the liquid component into the assembled cell. Specifically, a cathode-electrolyte comprising a suitable salt dissolved in an oxyhalide, a halide with a cosolvent or mixtures thereof can be dispensed through the vent orifice 25 into cavity 26 using the hypodermic needle 54 whereupon the cathode-electrolyte can penetrate through the separator and cathode collector of the cell. As shown in FIG. 1 a layer of sealant 27 such as a halocarbon wax is disposed between a polytetrafluoroethylene liner 29 and the wall defining orifice 23.

Figure 4:
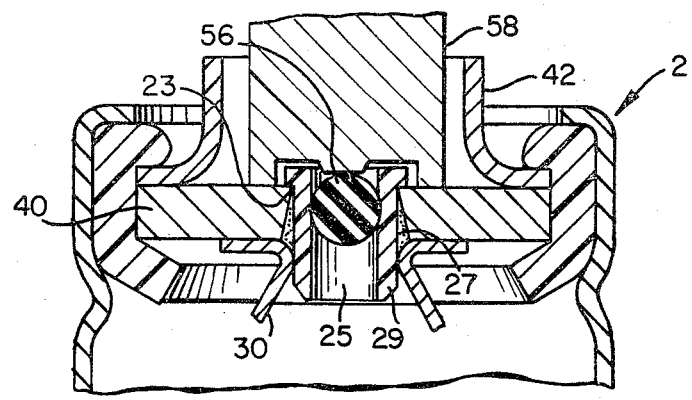
FIG. 4 is a partial vertical cross sectional view of the cell of FIG. 3 after the ball is force-fitted into the deformable liner.
Figure 5:
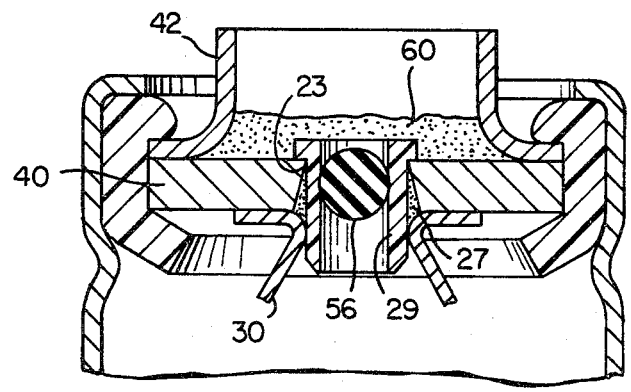
FIG. 5 is a partial vertical cross sectional view of a fully assembled cell.

As shown in FIG. 3, with the cell's liquid component fed into the container, a glass ball 56 is disposed over vent opening 25 in liner 29 and then a ram member 58 is used to force ball 56 into orifice 25 as shown in FIG. 4 whereupon the layer of sealant 27 and polytetrafluoroethylene liner 29 are disposed between the wall defining the orifice and the glass ball. After removal of the ram 58, a layer of a sealant 60 is disposed over ball 56 and cover 40 within cylindrical tube 42 producing a fully sealed cell employing the safety vent closure of this invention as shown in FIG. 5. The layer of sealant 27 and liner 29 isolate the glass ball from contacting the wall of orifice 23 directly so that the glass ball is not affected if any corrosion occurs to the wall of the orifice upon contact with the cell's components, such as an oxyhalide. Upon build-up of a predetermined pressure within the cell, the ball will be at least partially expelled forming a permanent vent to the atmosphere. The coefficient of friction between the ball and the wall of the corrosion-resistant liner will remain substantially constant thereby insuring that the cell will vent at a predetermined and predictable pressue build-up within the cell. Without the sealant layer 27, electrolyte could creep between the wall defining the orifice 23 and liner 29 to outside the cell where it could do damage to the device powered by the cell. The use of the sealant layer 27 is critically important to retard creepage of the electrolyte especially during the use of pressure or vacuum filling techniques.

Figure 6:
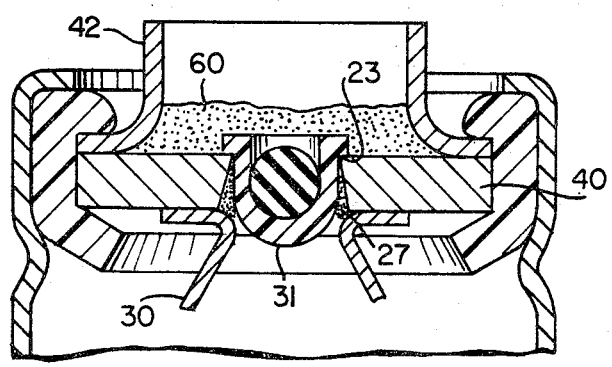
FIG. 6 is another view of a partial vertical cross sectional view of a fully assembled cell wherein a corrosion-resistant sheet was molded to shape when it was inserted into the orifice along with the ball and a layer of sealant is disposed at the interface of the liner and the wall defining the orifice.

FIG. 6 shows another embodiment of a cell of this invention having the same components as the cell shown in FIGS. 1 through 5 identified with the same reference numbers except that in place of liner 29, a sheet of polytetrafluoroethylene 31 was placed over the orifice 23 and the ball 56 was then forced into sheet 31. This effectively placed the polytetrafluoroethylene sheet 31 between the ball 56 and the wall defining orifice 23 with a layer of sealant 27 disposed between sheet 31 and the wall defining orifice 23.

Preferably prior to the adding of the liquid component of the cell, a vacuum could be created within the cell whereupon the liquid component could then be drawn effectively into the cell and uniformly distributed therein. Using this filling technique, the layer of sealant would retard electrolyte creepage up between the liner and the wall defining the orifice.

The safety vent closure of this invention will provide a means for venting of rapidly generated high pressure gas built up within a cell thereby preventing the rupture of the cell's container.

The following example is illustrative of the present invention and is not intended in any manner to be limitative thereof.

EXAMPLE

Several cell lots were made as basically shown in FIGS. 1 to 5 with and without a sealant disposed at the interface of the polytetrafluoroethylene liner and the wall defining the vent orifice using the following components:

anode of lithium;
cathode collector of polytetrafluoroethylene-bonded acetylene black; and
thionyl chloride containing 1.5M $LiAlCl_4$.

Each cell measured 0.475 inch diameter and was 1.65 inches long. The orifice for the cells with the liner measured 0.125 inch diameter and the ball made of glass had a diameter of 0.094 inch. The polytetrafluoroethylene liner measured 0.125 inch in diameter by 0.120 inch long and measured 0.023 inch thick. In some cell lots, a sealant of Halocarbon 15-00 Wax obtained from Halocarbon Products, Inc., Hackensack, N.J., was disposed between the wall defining the orifice and the liner. The sealant was applied either by coating the exterior of the liner (Cell Lot A) or by coating the orifice walls (Cell Lot B). Prior to adding the liquid oxyhalide, a vacuum was created within the cell and then the liquid oxyhalide was fed effectively into the cell and uniformly distributed therein.

In each cell the ball was forced into the vent orifice to produce a cell as basically shown in FIG. 4 except that in some cells a sealant was not employed.

In the cells of Cell Lot B that did not contain the sealant, an average of 85% showed visible (to the naked eye) evidence of electrolyte creepage between the wall defining the orifice and the liner. In the cells employing the sealant, only 4% of the cells showed any evidence of leakage. The cells were cleaned and then stored at a temperature and relative humidity (R.H.) for a period of time as shown in the table. The leakage at the interface of the wall defining the orifice and the liner was visually observed and rated according to the following scale:

0 = no visual leakage observed at 20X magnification
1 = leakage observed at 20X magnification
2 = leakage observed at 7X magnification
3 = leakage observed by naked eye The data show that the cells using the sealant of the subject invention exhibit retarded electrolyte leakage at the interface of the liner and the wall defining the orifice.

TABLE

| Storage Condition | Cells Without Sealant | | Cells With Sealant | |
|---|---|---|---|---|
| Time (days) | No. of Cells | Visual leakage | No. of Cells | Visual leakage |
| Cell Lot A | | | | |
| 24° C. | 10 | 10 | 2 | 10 | 0 |
| and | 14 | 10 | 2 | 10 | 0 |
| 50% R.H. | 30 | 10 | 2 | 10 | 0 |
| Cell Lot B | | | | |
| 23° C. | 1 | 35 | 1 | 45 | 0 |
| and | 7 | 5 | 2 | 5 | 0 |
| 80% R.H. | 14 | 5 | 2 | 5 | 0 |

What is claimed is:

1. In an electrochemical cell comprising active components of the cell assembled within a housing, said housing having at least one orifice defined by a wall in said housing, a liner that is corrosion-resistant to the cell's active components disposed adjacent the wall defining the orifice, a member force-fitted within said liner to provide a normally fluid tight-seal for said vent orifice, and wherein at least one of said member and said liner is resiliently deformable such that said member is adapted to be at least partially expelled from the vent orifice upon a predetermined internal gas pressure within the cell; the improvement wherein a first sealant is disposed at the interface of the wall defining the orifice and the corrosion resistant liner.

2. The electrochemical cell of claim 1 wherein said first sealant is selected from the group consisting of asphalt, wax and epoxy.

3. The electrochemical cell of claim 1 wherein the force-fitted member is made of a material selected from the group consisting of polytetrafluoroethylene, fluorinated ethylene-propylene polymer, perflouroalkoxyethylene polymer, ethylene-tetrafluoroethylene polymer, nylon, polypropylene, polycarbonate, acrylic polymers, metals, glass and ceramics.

4. The electrochemical cell of claim 1 wherein the liner is selected from the group consisting of nylon, polyethylene, polytetrafluoroethylene, fluorinated ethylene-propylene polymer, perflouroalkoxy polymer, ethylene-fluorinated ethylene polymer, glasses and metals.

5. The electrochemical cell of claim 1 wherein a conductive tubular member surrounds the vent orifice.

6. The electrochemical cell of claim 5 wherein a layer of a second sealant material is disposed within the conductive tubular member over the force-fitted member in the vent orifice and the area of the housing defining the vent orifice surrounded by the conductive tubular member.

7. The electrochemical cell of claim 6 wherein said second sealant material is selected from the group consisting of asphalt, wax, and epoxy.

8. The electrochemical cell of claim 1 wherein the force-fitted member is coated with a chemically inert material with respect to the cell's components.

9. The electrochemical cell of claim 1, which employs a cathode-electrolyte which contains at least one liquid oxyhalide selected from the group consisting of thionyl chloride, sulfuryl chloride, phosphorus oxychloride, thionyl bromide, chromyl chloride, vanadyl tribromide and selenium oxychloride.

10. The electrochemical cell of claim 9 wherein the forced-fitted member is glass, the liner is polytetrafluoroethylene and the first sealant is a halocarbon wax.

* * * * *